Aug. 7, 1923. Re. 15,668
B. G. BRAINE
SPLICE BAR FOR RAIL JOINTS
Original Filed March 23, 1916
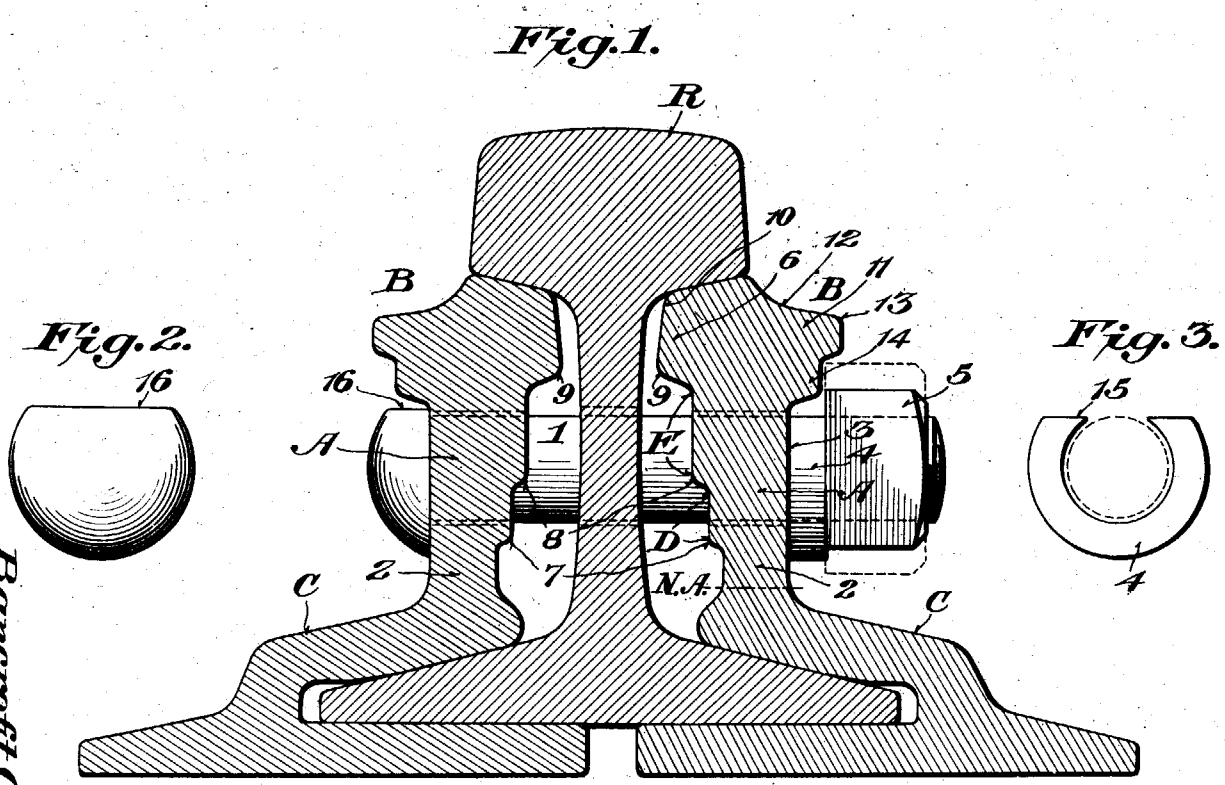
Inventor
Bancroft G. Braine
Witnesses:-
Chas. L. Grisebauer
Emory L. Groff
By D. P. Wolhaupter
Atty.

Reissued Aug. 7, 1923. Re. 15,668

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

SPLICE BAR FOR RAIL JOINTS.

Original No. 1,276,020, dated August 20, 1918, Serial No. 86,212, filed March 23, 1916. Application for reissue filed May 25, 1923. Serial No. 641,495.

*To all whom it may concern:*

Be it known that I, BANCROFT G. BRAINE, a citizen of the United States, and a resident of New York, county of New York, and State of New York, have invented new and useful Improvements in Splice Bars for Rail Joints, of which the following is a specification.

This invention relates to an improvement in splice bars for rail joints, and has special reference to a novel structural formation of the bar which admits of a new and effective distribution of the metal to obtain an increased efficiency in the bar above its horizontal neutral axis.

It is well known that a splice bar, of any type, when under load is subjected to the minimum strain adjacent its horizontal neutral axis. It is, therefore, proposed, by means of the present invention, to provide a novel and practical design of splice bar wherein the metal is so distributed above the foot of the bar as to obtain a better balancing of the metal in the entire bar than has heretofore been possible in the conventional forms of splice bars. This is particularly true with respect to the angle bar type of splice, which is open to the objection of not distributing the metal most effectively, particularly affecting the section modulus of the head portion of the bar, because of the limitations within the fishing space between the rail head and the rail base flange. Accordingly, a primary object of the present invention is to provide a construction of splice bar wherein the minimum amount of metal is used adjacent the horizontal neutral axis of the bar, and the amount of metal increased by graduated increments at increasing intervals from the horizontal neutral axis, so that a substantial reinforcing body of metal may be incorporated in the head member of the bar, thereby greatly strengthening the head member in a horizontal plane immediately below the safe line for wheel flange clearance. A further effect of this graduated increase in the thickness of the bar, above the horizontal neutral axis, is to strengthen and reinforce the web member of the bar; hence, a distinct and important feature of the invention is, not only to provide an enlarged and substantially widened head member representing the maximum thickness of metal, but to add the metal at the places where it is most needed to resist the loading stresses.

A further and general object of the invention is to provide a construction of splice bar having its reinforcements of metal so placed in the head and web members thereof as to utilize the metal to the best possible advantage, and particularly to obtain a bar of greater strength and stiffness for the same amount of metal as used in any given common angle bar, or to obtain a bar of the same strength with the use of less metal.

Another object of the invention is to provide a construction of bar which obviates the necessity of punching elongated holes in the bar to prevent the bolts from turning, as well as to provide for such a seating of the heads and nuts of the bolts as to permit an additional amount of metal to be placed in the head of the bar to greatly reinforce the same.

With these and other objects in view which will be readily understood as the nature of the invention is more fully explained, the latter consists in the novel structural formation, and distribution of metal, hereinafter more fully described, illustrated and claimed.

Though susceptible of modification in design without departing from the principle of construction involved, a preferred and practical embodiment is shown in the accompanying drawings, in which:—

Figure 1 is a cross-sectional view of a complete rail joint including a splice bar or joint bar having the improved features of construction claimed herein.

Fig. 2 is an end view of the truncated bolt head which cooperates with a shoulder of the splice bar to prevent turning of the bolt.

Fig. 3 is an end view of the truncated nut bearing member or washer which admits of the further enlargement of the outer side of the head of the bar to a point well below the top line of the nuts.

Like references designate corresponding parts in the several figures of the drawings.

In carrying forward the present invention the improved features of construction, involving a new and effective distribution of the metal are preferably incorporated in a bar having an advanced outward location of the web thereof. That is, it is preferable to have the bar web disposed at a somewhat greater distance from the web of the rail than is customary, because of the known fact that such a location of the web of the bar contributes to the efficiency of the foot of the bar, while at the same time permitting of a very substantial enlargement, both laterally and vertically of the head of the bar, so that the latter may be greatly increased in strength.

Therefore, it is to be observed that, in its best or preferred form, the present invention involves a splice bar including a web member A, a head member B, and a foot member C, with the web member A having a position wherein it occupies an advanced outward location from the web of the rail R, and the main body of metal therein is intersected by a vertical plane at the outer side of the rail head. The present invention, accordingly, preferably utilizes the distinct advantage of an advanced outward location of the web of the bar, and provides for the strengthening of the upper chord or head, and the web member, by means of the feature of increasing the body or thickness of metal, above the horizontal neutral axis, by graduated increments or enlargements at the places where reinforcement is most needed to resist the loading stresses.

The distinctive and novel feature referred to, namely, that of the graduated increments or enlargements of metal above the horizontal neutral axis, is clearly shown in the drawings. Referring thereto it will first be observed that the horizontal neutral axis in the illustration occurs substantially at the line designated N. A., below the line of the joint bolts 1, and at this place the minimum amount of metal may be used, thereby forming a substantially narrow neck portion or area 2 connecting the web member A with the foot member C of the bar.

Above the reduced neck portion 2, the web member A of the bar is of a graduated formation upon the inner side thereof. As shown, the said web member is provided at its outer side with a flat vertical bolting face 3 against which is seated the nut bearing member or washer 4, against which bears the locking nut 5; while the inner side of the upright web member is of the stepped formation referred to. This stepped formation involves the entire inner side of the bar from the reduced neck portion up to the inside head projection 6, and, primarily consists of a graduated stepping up in the thickness of the metal from the zone or area of minimum thickness to the zone or area of maximum thickness in the head of the bar. This graduated stepped formation, upon the inner side of the web of the bar, produces progressively increased web enlargements D and E respectively. The first of these enlargements (D) contains less area of metal than the next succeeding enlargement (E), and said enlargements present at the inner side of the bar the ribs or shoulders 7 and 8, respectively. The rib or shoulder 7 of the web enlargement D is disposed below the line of the bolts, while the rib or shoulder 8 of the upper web enlargement E occurs in a plane between the top and bottom of the bolt holes. Thus, the said enlargement E extends at the inner side of the bar, from its rib or shoulder 8, between the top and bottom of the bolt holes, to the inclining shoulder 9 at the under side of the inner head projection 6, and the latter is provided with an inner substantially vertical clearance face 10 which is spaced from the rail web to permit of the necessary adjustment of the bar at this point. In connection with this step formation of the inner side of the bar, it will be observed that the straight surfaces between the stepping ribs 7 and 8 are maintained substantially parallel with the vertical outer face of the bar, thereby preserving a parallelism between the outer and inner sides of the bar which is very desirable to facilitate a cold punching operation, as well as accurate punching, as hereinafter more fully referred to.

In addition to the inside stepped formation of the bar, as described, the head of the bar is materially reinforced or strengthened by the outside plural rib formation thereof. This plural rib formation essentially consists in the head member B having an outer projection 11 extending up to the line of wheel flange clearance 12 and provided with stepped projections of metal 13 and 14, respectively. These stepped projections of metal are in the form of outwardly projecting ribs which materially increase the area of metal in the head member by the widening and deepening thereof at the outer side of the bar. And, it will be observed, that, by reason of employing a nut bearing member or washer 4 which is truncated or cut away at one side as at 15, the metal in the lower or innermost projection of rib 14 may be carried substantially into a horizontal plane at the top of the bolt hole. This brings the metal so low at this point as to materially deepen the outer head projection 11 and provide for a very substantial reinforcement of the head of the bar. The location and disposition of the metal in the lowermost rib 14 are such that the metal is carried well below the top line of the nuts (the long diameter being the measure) which has been found to be a very important and practical feature in the construction of splice bars of the reinforced-head type.

The novel construction described also permits of the bars being punched with round bolt holes, because it is simply necessary to truncate, or cut off, the bolt heads, on one side as at 16, to provide a lock which prevents the turning of the bolt. In this connection it will be observed that the truncated or cut off portion 16 of the bolt head will be disposed under the shoulder of the lower rib 14, thus providing the interlock referred to.

In connection with the reinforcement of the web member by means of the stepped or progressively increased web enlargements D and E, it will be noted that while this construction gradually and proportionately increases the strength of the web upward from the horizontal neutral axis, yet at the same time the web of the bar may be maintained of such a thickness as to permit of an easy punching of the bolt holes. That is to say, the step formation at the inner side of the bar is of practical importance, not only to provide for the graduated reinforcement from the horizontal neutral axis upward to the head of the bar, but also provides, at the inner side of the bar, upright or vertical faces substantially parallel to the adjacent portion of the rail web, thus making it possible for a reinforced bar of this type to have the bolt holes punched therein with the same facility as the punching of the bolt holes in the straight web of an ordinary angle bar. The operation of punching the bolt holes is rendered more difficult and less accurate where the punch is required to pass through a surface not at substantially right angles thereto, or in other words, through an inclining or curved surface, such as shown in some of the prior art. Accordingly, the step formation at the inner side of the joint bar represents an improvement in the art of practical importance, both from a manufacturing standpoint and from the standpoint of providing a desirable means of properly balancing the metal distributed throughout the bar above the horizontal neutral axis. In this connection, it will be observed that the construction referred to permits the web of the bar, at its maximum thickness, to be substantially of a thickness equal to the diameter of the bolt holes within the bolt hole punching zone, thereby permitting the bars to be punched cold; at the same time permitting of the thinning out of the metal toward the horizontal neutral axis to obtain the graduated reinforcement desired.

From the foregoing it is thought that the construction and many advantages of the herein described improvements will be readily understood without further description, and it is to be noted that changes in the form, proportion and minor details of the construction, as fall within the scope of the appended claims, may be resorted to without departing from the spirit or sacrificing any of the advantages of the invention.

I claim:—

1. A splice bar of uniform section having a step formation at the inner side of its web.

2. A splice bar of uniform section having a vertically stepped formation at the inner side of its web.

3. A splice bar having a foot member, a web member of downwardly diminishing thickness connected with the foot member, and a laterally enlarged head member provided at its outer side with stepped projections arranged at progressively increasing distances from the outer side of the bar.

4. A splice bar having an outer vertical face, and provided at its inner side and also at its outer side with stepped projections arranged at progressively increasing distances from said face.

5. A splice bar provided with a web member and a laterally enlarged head member, the web member having an outer vertical face below the bolt holes and a plurality of inner straight faces spaced at progressively increasing distance from the inner face toward the head and having at its outer side a plurality of projections at progressively increasing distance from the vertical plane of said outer vertical face.

6. A splice bar of uniform section provided at the inner side of its web with a plurality of stepped shoulders, and straight faces substantially parallel with the outer side of the bar.

7. A splice bar of uniform section having a straight vertical outer face, and a plurality of inner straight faces substantially parallel with said outer face and spaced from the latter at progressively increasing distances toward the head of the bar.

8. A splice bar of uniform section having a straight vertical outer face, and a plurality of inner straight faces substantially parallel with said outer face and spaced from the latter at progressively increasing distances toward the head of the bar, the maximum thickness between the outer face and one of the inner faces within the bolt hole area being of substantially a thickness equal to the diameter of the bolt hole.

9. A splice bar of uniform section having a foot member, an enlarged head member, and a web member formed with a narrow neck portion adjacent the horizontal neutral axis and provided at its inner side with vertically stepped enlargements, the uppermost of these enlargements extending from the head member to a point between the top and the bottom of the bolt holes.

10. A splice bar of uniform section having a foot member, a head member, and a web member formed with a narrow neck portion adjacent the horizontal neutral axis and provided at its inner side with vertically stepped enlargements, the lowermost enlargement extending from a point below the bolt holes to the uppermost enlargement, and the latter extending from a point between the top and bottom of the bolt holes to the head member.

11. A splice bar having a foot member, a web member of downwardly diminishing thickness connected with the foot member, and a laterally enlarged head member provided at its outer side with separate ribs arranged in stepped relation to each other, the innermost rib extending downwardly to substantially the top line of the bolt holes.

12. A splice bar provided with a web member and a laterally enlarged head member, the web member having an outer vertical bolting face and a plurality of inner straight faces spaced at progressively increasing distance from the outer face toward the head, and the latter having at its outer side a plurality of projections at progressively increasing distance from the vertical plane of said outer vertical face.

13. A splice bar having a web member provided with an outer vertical bolting face, and a laterally enlarged head member which is provided with a concavity for wheel flange clearance and at its outer side with a plurality of longitudinal ribs arranged in vertically stepped relation to each other, the rib at the least distance from the bolting face lying closer to the bolt holes.

14. A splice bar of uniform section having a laterally enlarged head member which is provided at its outer side with a plurality of ribs arranged in vertically stepped relation to each other, the innermost rib lying in proximal relation to the bolt holes.

15. A splice bar having a laterally enlarged head member which is provided at its outer side with a plurality of longitudinal ribs arranged in vertically stepped relation to each other.

16. A splice bar having at the outer side of its head alternating enlargement shoulders and straight faces, the latter being substantially parallel with the outer vertical face of the bar.

In testimony whereof I hereunto affix my signature in the presence of two witnesses.

BANCROFT G. BRAINE.

Witnesses:

E. K. KERSHNER,

G. M. COLWELL.